US008099337B2

(12) United States Patent
Guldner et al.

(10) Patent No.: US 8,099,337 B2
(45) Date of Patent: Jan. 17, 2012

(54) REPLENISHMENT PLANNING MANAGEMENT

(75) Inventors: Andreas Guldner, Ueberherrn (DE); Franz-Josef Jakobs, Voelklingen (DE)

(73) Assignee: SAP AG, Walldorf (DE)

( * ) Notice: Subject to any disclaimer, the term of this patent is extended or adjusted under 35 U.S.C. 154(b) by 1011 days.

(21) Appl. No.: 11/765,127

(22) Filed: Jun. 19, 2007

(65) Prior Publication Data

US 2008/0319770 A1 Dec. 25, 2008

(51) Int. Cl.
*G06Q 10/00* (2006.01)
(52) U.S. Cl. ............................................. 705/28; 705/8
(58) Field of Classification Search .................. 700/108, 700/100; 705/8, 16, 28, 26
See application file for complete search history.

(56) References Cited

U.S. PATENT DOCUMENTS

| | | | |
|---|---|---|---|
| 4,752,877 A | 6/1988 | Roberts et al. | |
| 5,315,508 A | 5/1994 | Bain et al. | |
| 5,400,253 A | 3/1995 | O'Connor | |
| 5,615,109 A | 3/1997 | Eder | |
| 5,675,637 A | 10/1997 | Szlam et al. | |
| 5,758,327 A | 5/1998 | Gardner et al. | |
| 5,774,866 A | 6/1998 | Horwitz et al. | |
| 5,870,716 A | 2/1999 | Sugiyama et al. | |
| 5,930,769 A | 7/1999 | Rose | |
| 5,930,771 A | 7/1999 | Stapp | |
| 5,974,418 A | 10/1999 | Blinn et al. | |
| 5,999,914 A | 12/1999 | Blinn et al. | |
| 6,029,139 A | 2/2000 | Cunningham et al. | |
| 6,064,984 A | 5/2000 | Ferguson et al. | |
| 6,185,550 B1 | 2/2001 | Snow et al. | |
| 6,260,024 B1 | 7/2001 | Shkedy | |
| 6,338,039 B1 | 1/2002 | Lonski et al. | |
| 6,341,351 B1 | 1/2002 | Muralidhran et al. | |
| 6,363,488 B1 | 3/2002 | Ginter et al. | |
| 6,366,890 B1 | 4/2002 | Usrey | |
| 6,418,416 B1 * | 7/2002 | Rosenberg et al. | 705/28 |
| 6,484,149 B1 | 11/2002 | Jammes et al. | |
| 6,505,093 B1 | 1/2003 | Thatcher et al. | |
| 6,507,851 B1 | 1/2003 | Fujiwara et al. | |
| 6,567,822 B1 | 5/2003 | Cudahy et al. | |
| 6,614,895 B1 | 9/2003 | Impey et al. | |
| 6,665,577 B2 | 12/2003 | Onyshkevych et al. | |

(Continued)

FOREIGN PATENT DOCUMENTS

JP 2004-030343 A 1/2004

(Continued)

OTHER PUBLICATIONS

"InfoNow Makes Channel Intelligence Available on Demand; Software-as-a-service reporting tool AnalyticInsight delivers increased visibility into channel sales performance; enables more informed, strategic decision-making." PR Newswire May 30, 2007 Business Dateline, ProQuest. Web. Oct. 15, 2011.*

(Continued)

*Primary Examiner* — Matthew Gart
*Assistant Examiner* — Rokib Masud
(74) *Attorney, Agent, or Firm* — Foley & Lardner LLP

(57) ABSTRACT

A computer-implemented method of managing stock levels includes obtaining target-location-dependent information pertaining to a location product in an order management system using order proposals for management of the stock levels. The location product may not be included in an active order proposal. A computer-readable medium and/or system may also be provided.

19 Claims, 3 Drawing Sheets

U.S. PATENT DOCUMENTS

| | | |
|---|---|---|
| 6,678,695 B1 | 1/2004 | Bonneau et al. |
| 6,701,299 B2 | 3/2004 | Kraisser et al. |
| 6,725,204 B1 | 4/2004 | Gusley |
| 6,829,348 B1 | 12/2004 | Schroeder et al. |
| 6,868,528 B2 | 3/2005 | Roberts |
| 6,910,017 B1 | 6/2005 | Woo et al. |
| 6,980,966 B1 | 12/2005 | Sobrado et al. |
| 7,080,030 B2 | 7/2006 | Eglen et al. |
| 7,082,408 B1 | 7/2006 | Baumann et al. |
| 7,082,426 B2 | 7/2006 | Musgrove et al. |
| 7,092,929 B1 | 8/2006 | Dvorak et al. |
| 7,117,165 B1 | 10/2006 | Adam et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 7,177,825 B1 | 2/2007 | Borders et al. |
| 7,188,080 B1 | 3/2007 | Walker et al. |
| 7,308,421 B2 | 12/2007 | Raghupathy et al. |
| 7,330,817 B1 | 2/2008 | Exall et al. |
| 7,346,561 B1 | 3/2008 | Devitt et al. |
| 7,424,440 B1 | 9/2008 | Gupta et al. |
| 2001/0019778 A1 | 9/2001 | Gardaz et al. |
| 2001/0032130 A1 | 10/2001 | Gabos et al. |
| 2001/0039517 A1 | 11/2001 | Kawakatsu |
| 2001/0049634 A1 | 12/2001 | Stewart |
| 2002/0013731 A1 | 1/2002 | Bright et al. |
| 2002/0023500 A1 | 2/2002 | Chikuan et al. |
| 2002/0026368 A1 | 2/2002 | Carter, III |
| 2002/0042731 A1 | 4/2002 | King, Jr. et al. |
| 2002/0059093 A1 | 5/2002 | Barton et al. |
| 2002/0059108 A1 | 5/2002 | Okura et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0091598 A1 | 7/2002 | Farkas |
| 2002/0107713 A1 | 8/2002 | Hawkins |
| 2002/0116241 A1 | 8/2002 | Sandhu et al. |
| 2002/0123930 A1 | 9/2002 | Boyd et al. |
| 2002/0138290 A1 | 9/2002 | Metcalfe et al. |
| 2002/0140741 A1 | 10/2002 | Felkey et al. |
| 2002/0147668 A1 | 10/2002 | Smith et al. |
| 2002/0152128 A1 | 10/2002 | Walch et al. |
| 2002/0156686 A1 | 10/2002 | Kraft et al. |
| 2002/0184116 A1 | 12/2002 | Tam et al. |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0055718 A1 | 3/2003 | Cimini et al. |
| 2003/0074269 A1 | 4/2003 | Viswanath |
| 2003/0083914 A1 | 5/2003 | Marvin, III et al. |
| 2003/0083961 A1 | 5/2003 | Bezos et al. |
| 2003/0126024 A1 | 7/2003 | Crampton et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0200150 A1 | 10/2003 | Westcott et al. |
| 2003/0200156 A1 | 10/2003 | Roseman et al. |
| 2003/0208365 A1 | 11/2003 | Avery et al. |
| 2003/0225778 A1 | 12/2003 | Fisher et al. |
| 2003/0229502 A1 | 12/2003 | Woo |
| 2004/0010463 A1 | 1/2004 | Hahn-Carlson et al. |
| 2004/0025048 A1 | 2/2004 | Porcari et al. |
| 2004/0042611 A1 | 3/2004 | Power et al. |
| 2004/0098358 A1 | 5/2004 | Roediger |
| 2004/0122689 A1 | 6/2004 | Dailey et al. |
| 2004/0162763 A1 | 8/2004 | Hoskin et al. |
| 2004/0172321 A1 | 9/2004 | Vemula et al. |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0240639 A1 | 12/2004 | Colson et al. |
| 2004/0243428 A1 | 12/2004 | Black et al. |
| 2004/0267674 A1 | 12/2004 | Feng et al. |
| 2005/0015303 A1 | 1/2005 | Dubin et al. |
| 2005/0021551 A1 | 1/2005 | Silva et al. |
| 2005/0047577 A1 | 3/2005 | Timmins |
| 2005/0055283 A1 | 3/2005 | Zarovinsky |
| 2005/0060270 A1 | 3/2005 | Ramakrishnan |
| 2005/0060318 A1 | 3/2005 | Brickman |
| 2005/0065872 A1 | 3/2005 | Moebs et al. |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0137932 A1 | 6/2005 | D'Angelo et al. |
| 2005/0165659 A1 | 7/2005 | Gruber |
| 2005/0171825 A1 | 8/2005 | Denton et al. |
| 2005/0197952 A1 | 9/2005 | Shea et al. |
| 2005/0216322 A1 | 9/2005 | Weild |
| 2005/0216323 A1 | 9/2005 | Weild |
| 2005/0216359 A1 | 9/2005 | Welter et al. |
| 2005/0228685 A1 | 10/2005 | Schuster et al. |
| 2005/0256727 A1 | 11/2005 | Bennett et al. |
| 2005/0261954 A1 | 11/2005 | Aoyama et al. |
| 2005/0278052 A1* | 12/2005 | Bett et al. ...................... 700/108 |
| 2006/0020512 A1 | 1/2006 | Lucas et al. |
| 2006/0036507 A1 | 2/2006 | Pujar et al. |
| 2006/0069598 A1* | 3/2006 | Schweitzer et al. ............... 705/8 |
| 2006/0112099 A1 | 5/2006 | Musgrove et al. |
| 2006/0184457 A1 | 8/2006 | Sanderlin |
| 2006/0282360 A1 | 12/2006 | Khan et al. |
| 2007/0050272 A1 | 3/2007 | Godlewski et al. |
| 2008/0118051 A1 | 5/2008 | Odinak et al. |
| 2008/0167936 A1 | 7/2008 | Kapoor |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

U.S. Appl. No. 60/374,892, filed Apr. 22, 2002, Krajec.

"Beyond Markdown Management", summer/autumn 03, the 4caster, Issue 4, vol. 2, 4 pages.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

Bender, Walter, When Product Designers Use Perceptually Based Color Tools, Journal of Electronic Imaging, Jan. 2001, pp. 188-193, vol. 10(1).

Fennell et al., A Integrated Approach-Market Definition, Market Segmentation, and Brand Positioning Create a Powerful Combination, Winter 2004, Market Research, pp. 29-34 (7 pgs. total).

Georgantis et al., A Review and Evaluation of Platforms and Tools for Building e-Catalogs, 2002, Proceedings of the 35th Hawaii International Conference of System Sciences, 2002 IEEE, 10 pages.

Kumar et al., Managing Supplier Relationships, Quality Progress, Sep. 2003, pp. 24-30, vol. 36, Iss. 9.

Notice of Allowance for U.S. Appl. No. 11/220,449, mail date Jan. 12, 2010, 5 pages.

Notice of Allowance on U.S. Appl. No. 10/898,898, mail date Feb. 2, 2010, 14 pages.

Office Action for U.S. Appl. No. 10/898,898, mail date Feb. 10, 2009, 16 pages.

Office Action for U.S. Appl. No. 10/898,898, mail date Jul. 24, 2008, 14 pages.
Office Action for U.S. Appl. No. 10/898,898, mail date Jun. 24, 2009, 48 pages.
Office Action for U.S. Appl. No. 10/898,898, mail date Oct. 15, 2007, 9 pages.
Office Action for U.S. Appl. No. 10/913,645, mail date Feb. 19, 2010, 19 pages.
Office Action for U.S. Appl. No. 10/913,645, mail date May 28, 2009, 15 pages.
Office Action for U.S. Appl. No. 10/913,645, mail date Nov. 2, 2009, 17 pages.
Office Action for U.S. Appl. No. 10/913,645, mail date Oct. 30, 2008, 11 pages.
Office Action for U.S. Appl. No. 10/935,470, mail date Aug. 26, 2008, 11 pages.
Office Action for U.S. Appl. No. 10/935,470, mail date Feb. 6, 2009, 13 pages.
Office Action for U.S. Appl. No. 10/935,470, mail date Jan. 19, 2010, 12 pages.
Office Action for U.S. Appl. No. 10/935,470, mail date Jul. 16, 2009, 11 pages.
Office Action for U.S. Appl. No. 11/048,124, mail date Apr. 29, 2009, 17 pages.
Office Action for U.S. Appl. No. 11/048,124, mail date Dec. 31, 2009, 17 pages.
Office Action for U.S. Appl. No. 11/074,369, mail date Aug. 1, 2008, 9 pages.
Office Action for U.S. Appl. No. 11/074,369, mail date Dec. 11, 2007, 7 pages.
Office Action for U.S. Appl. No. 11/220,449, mail date Sep. 21, 2009, 14 pages.
PIMA 2004 Leadership Conference Schedule of Events for Monday, Jun. 28, 2004, Winter/Spring 2004, The PIMA Post, 8 pages.
Poisson, John, Value Creation Through Tactical Pricing, Accenture, 2004, 12 pages, PIMA Conference, New Orleans, LA.
Office Action for U.S. Appl. No. 10/913,645, mail date Jul. 28, 2010, 21 pages.
Office Action for U.S. Appl. No. 10/935,470, mail date Jul. 30, 2010, 12 pages.
Office Action for U.S. Appl. No. 11/048,124, mail date Dec. 3, 2010, 19 pages.
Office Action for U.S. Appl. No. 11/048,124, mail date Jun. 7, 2010, 17 pages.
Abraham et al., "An Implemented System for Improving Promotion Productivity Using Store Scanner Data", Marketing Science, Summer 1993, vol. 12, No. 3, pp. 248-269.
Anon., "(A Lot of) Life After H. Ross: Electronic Data Systems", *Financial World*, vol. 162, No. 22, Nov. 9, 1993 (p. 50(2)).
"Beyond Markdown Management", the 4caster, Issue 4, vol. 2, 4 pages, summer/autumn 2003.
Brown, "The Effects of Assortment Composition Flexibility on Operating Efficiency", (Abstract Only), *Dissertation Abstracts Int'l.*, vol. 55/08-A, available at least by 1994, (p. 2458).
"Retailers Manage Markdown Challenges Using i2 Solutions", Jan. 13, 2003, NRF 92nd Annual Convention & Expo, 2 pages.
Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.
Jensen et al., "Long-Term Construction Contracts: The Impact of Tamra '88 on Revenue Recognition", *Journal of Construction Education*, Spring 1997, vol. 2, No. 1, pp. 37-53.
Kelkar et al., Price Modeling in Standards for Electronic Product Catalogs Based on XML, 2002, pp. 366-375.
Office Action for U.S. Appl. No. 10/935,470, mail date Jan. 11, 2011, 13 pages.
Office Action for U.S. Appl. No. 11/048,124, mail date Apr. 25, 2011, 20 pages.
Office Action for U.S. Appl. No. 12/785,301, mail date Apr. 18, 2011, 6 pages.

* cited by examiner

REPLENISHMENT PLANNING MANAGEMENT

FIELD

The present disclosure generally relates to the field of managing data. The present disclosure relates more specifically to management of data for purposes of managing stock levels.

BACKGROUND

Management of stock levels of products can be a time consuming task. Use of order proposals can provide specific instructions regarding the transfer of products. There can be many reasons for product transfer, including transfer of products from a distribution center to a stores as well as transfers between distribution centers and between stores, to avoid unacceptably low stock levels.

Typically, a replenishment planner is able to view existing order proposals, but is unable to view products not in current order proposals. Thus, there is a need to provide an ability to obtain information regarding products not in a current order proposal.

SUMMARY

Various embodiments of the invention may provide a stock level management tool that can be used to monitor the various location products for which a replenishment planner is responsible. Examples include providing an ability to obtain information on location products not included in active order proposals.

One embodiment relates to a computer-implemented method of managing stock levels. The method includes obtaining target-location-dependent information pertaining to a location product in an order management system using order proposals for management of the stock levels. According to the embodiment, the location product is not included in an active order proposal.

A computer-readable medium for use with an electronic device is provided according to a further embodiment. The medium has instructions executable using the electronic device for performing a method of managing stock levels. The instructions include obtaining target-location-dependent information pertaining to a location product in an order management system using order proposals for management of the stock levels. According to the embodiment, the location product is not included in an active order proposal.

A further embodiment provides a system for managing stock levels. The system includes an obtaining module that is configured to obtain target-location-dependent information pertaining to a location product in an order management system using order proposals for management of the stock levels. The location product is not included in an active order proposal. A worklist creation module is also provided and configured to create a worklist of a plurality of location products according to selected criteria. Examples of such criteria can include supplying location and assigned replenishment planner.

Another embodiment of the invention provides a computer-implemented method of managing stock levels. The method is implemented in an order management system using order proposals for management of the stock levels. Target-location-dependent information pertaining to a location product is obtained. Critical criteria parameters are defined for the order management system. The critical criteria parameters correspond to location products requiring attention. The location products having the critical criteria parameters are displayed to a user

DETAILED DESCRIPTION OF THE EXEMPLARY EMBODIMENTS

Figure 1:
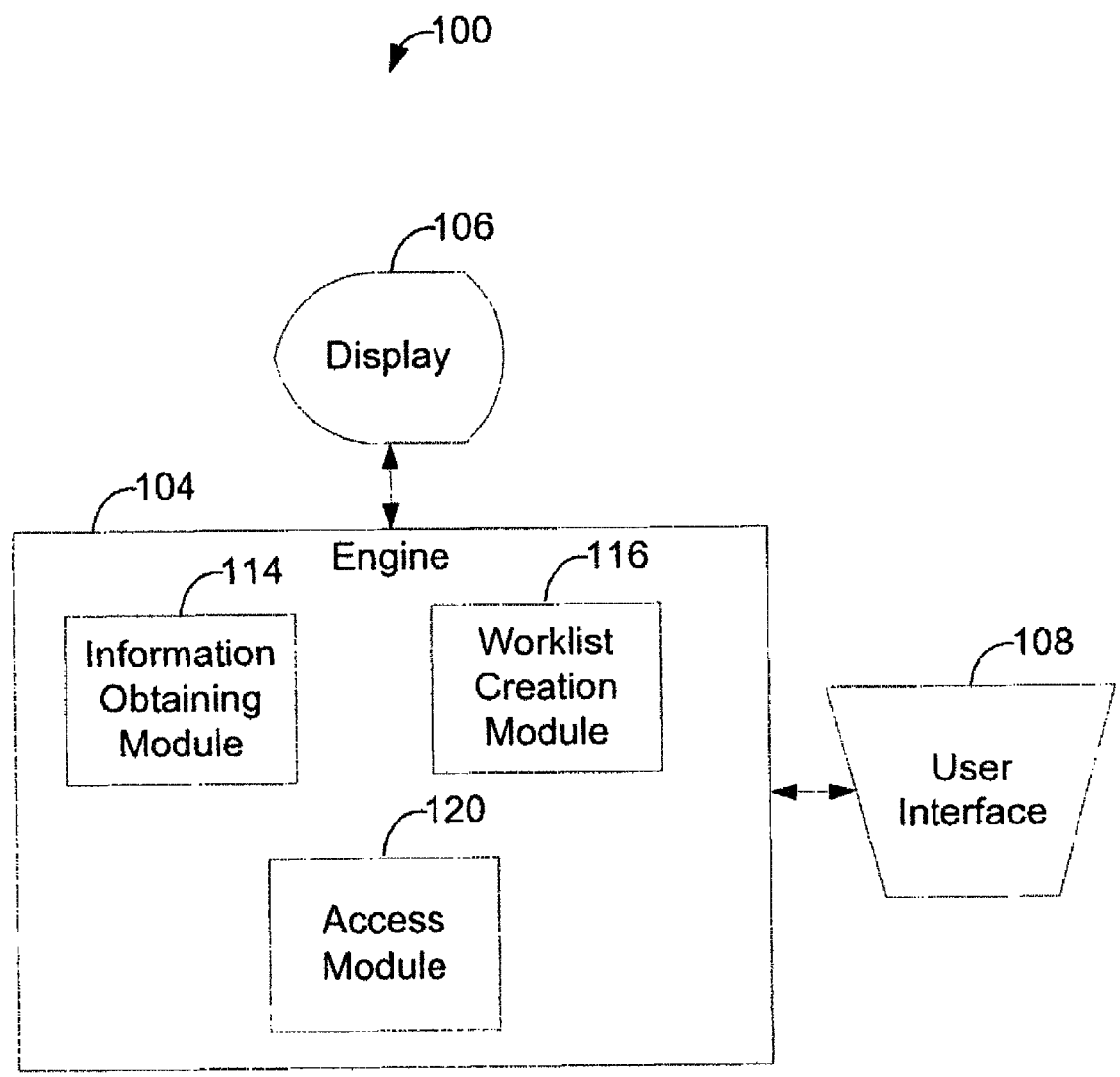
FIG. 1 is a schematic view of a stock management system according to one exemplary embodiment.

Referring to FIG. 1, a stock management system 100 according to an example embodiment is configured to provide an ability to obtain information regarding location products, including those not included in active order proposals. Such a system can provide an ability to manage stock levels of various location products. As used herein, a location product refers to a product having a designated receiving (e.g. target) location. Such product be any item associated with stock level information. In one example, a product may be a specific size and color configuration of an item. In another non-limiting example, a stock keeping unit (SKU) identifier may be assigned to each product.

An order proposal includes information pertaining to a transfer of a location product, information such as, for example, source location, target location and item data. Order proposals include at least one order proposal item. Examples of order proposal items can include a product number, an order proposal quantity, an order unit and delivery date. Stock levels may be managed by such transfers as specified in order proposals.

Examples of source locations and target locations include, but are not limited to, a distribution center, a store, and an external vendor. Examples of transfers specified by an order proposal can include store-to-store transfers, distribution center transfers to a store and transfers from an external vendor to a distribution center or directly to a store. Returns of items from a distribution center to a store are further examples. Distribution centers may also transfer to other distribution centers. Although not required, distribution centers can be designated to supply specific stores. Alternatively or in addition, distribution centers can be specific to products or types of products and supply stores served by other distribution centers.

It is understood that the system 100 can be used in non-retail applications. Applications can also include, for example, wholesale applications, inter and intra-organizational cost accounting applications. Examples of applications can include managing stock levels for one or more levels of the distribution chain.

In various exemplary embodiments, the stock management system 100 may be a hardware (e.g. digital logic of a computer) or a software implementation or a combination thereof. Software implementations are typically provided as a computer program product that contains computer-readable code stored on a computer-readable medium for use by a computer. Hardware implementations may be provided using digital logic circuitry, analog circuitry, a combination thereof, or any other past, present, or future hardware technology. Stock management system 100 generally includes an engine 104, a display 106, and a user interface 108.

Engine 104 is configured to manage the stock levels of location 102. In one exemplary embodiment, engine 104 may be located substantially centrally, such as on one or more servers, and accessed by locations across a network such as the Internet, a LAN, a WAN, etc. In another exemplary embodiment, engine 104 may be decentralized with the logic being located, either in software or hardware, at each location. Engine 104 generally includes an information obtaining module 114, a worklist creation module 116, and an access module 120. It is understood that the engine 104 may be employed by the use of a different module structure than that illustrated and that one or more modules may be located on one or more servers and/or networks.

Information obtaining module 114 is configured to obtain information that relates to one or more location products that are not in an active order proposal. Such information, pertaining to a specific location product, is target-location-dependent information, as the location product is a product having a designated receiving (e.g. target) location. Information obtained can include a wide variety of data, including those noted below, as optionally contained in a worklist.

Worklist creation module 116 is configured to create a worklist containing information about one or more location products that can aid a user, such as a replenishment planner, in overseeing and providing input to management of stock levels Examples of such information can include receiving location (e.g. distribution center, store); product, supplying location (e.g. external vendor, distribution center, store); assignment of a vendor subrange to a supplying location; replenishment planner; merchandise category; layout display module; product hierarchy/product hierarchy entry; location products that appear or do not appear in an order proposal with a specific status; location products that appear in order proposals that are locked by users; planning period, e.g. location products that can be planned in this predefined period; location products that are in outstanding order proposal items, e.g. having a delivery date that is in the past and are not flagged as "finally delivered" optionally within a definable observation period; location products that appear in unfulfilled order proposal items of the receiving location optionally within a definable observation period; and/or location products with a strong trend that may be positive (consumption peak) or negative (consumption trough).

Further examples of information that a worklist can optionally contain include location products for which there is no forecast or planning data; a calculated order proposal quantity of zero for a location product (including those rounded to zero); location products that currently appear in a switch relationship (with substitution type "follow-up product") as a follow-up product or in a switch relationship (with substitution type "replacement product") as original product or replacement product; location products that have zero stock or a negative stock; location products that have replenishment blocking (at location level, product level or location product level); location products whose listing starts in a specific period; location products to which a contract is assigned; location products that have been newly introduced, optionally within a definable observation period; location products that show unexpected consumption troughs; location products that show certain exceptions; location products for which exceptions exist with high priority; location products that have a certain replenishment type; and/or location products flagged as critical.

Access module 120 is configured to control access rights that various users have to the engine 104. In various exemplary embodiments, access rights may include read access, write access (e.g. enabling modifications), copy access, or any other rights an administrator of engine 104 may wish to restrict. For example, access module 120 may enable viewing and/or modification of information pertaining to various location products.

Display 106 is configured to give a visual output from engine 104 to a user. According to one exemplary embodiment, display 106 may give information relating to proposed reallocation of stock levels of a product, stock level information, or any other information that may be available to engine 104. In various examples, display 106 may be a cathode-ray-tube (CRT) display, liquid crystal display (LCD), plasma display, digital light processing (DLP) display, or any other past, present, or future display technology.

User interface 108 is configured to provide a user with access to engine 104. As discussed previously, for example, a user may make modifications to a proposed reallocation of stock levels. A user may wish to view stock level information, sales information, reallocation information, or any other pertinent information on display 106 and may manipulate user interface 108 to make such selections. According to various exemplary embodiments, user interface 108 may be of any past, present, or future design and may include one or more of a tactile touch screen on display 106, a knob, a pushbutton, a directional controller, a lever, voice activation, any other means of control, or any combination thereof. User interface 108 may also include a computer-readable media drive to facilitate software updates; uploading of stock, sales, or reallocation information; or other functions loadable from a computer readable medium.

Figure 2:
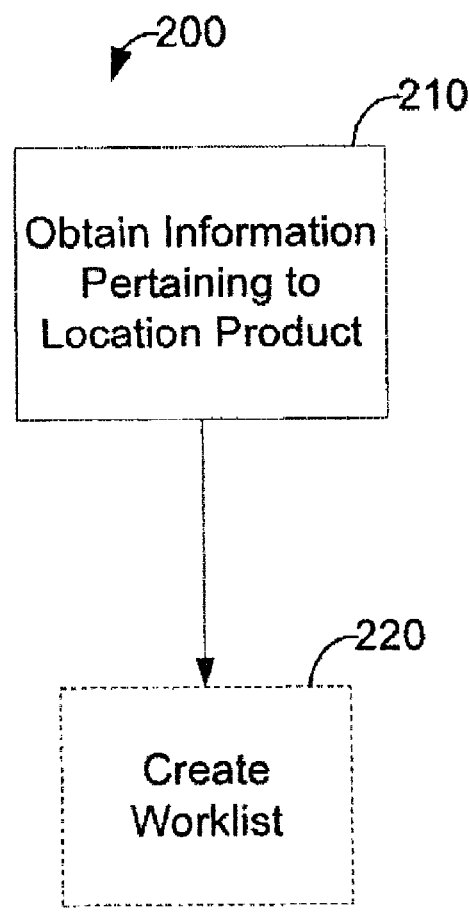
FIG. 2 is a flow diagram of a method for managing stock levels, optionally within the system of FIG. 1, according to one exemplary embodiment.

Referring to FIG. 2, a method 200 according to one exemplary embodiment for managing stock levels, is illustrated. The method 200 includes obtaining 210 target-location-dependent information pertaining to a location product in an order management system using order proposals for management of the stock levels. According to the example embodiment, the location product is not included in an active order proposal. Optionally, a worklist may be created 220. As noted above, a wide variety of selection criteria may optionally be used in creating the worklist. Examples include, but are not limited to, selection criteria such as: limiting a receiving location to a distribution center; limiting a receiving location to a store; product selection; limiting a supplying location to be an external vendor, or a subrange of vendors, limiting to an assigned replenishment planner; limiting to location products having no forecast data or planning data; limiting to location products that have replenishment blocking, e.g. have been designated to prevent their replenishment; limiting to location products that have been introduced within a specified period, which may be specified by a user or predetermined; and/or location products having a zero stock level.

Figure 3:
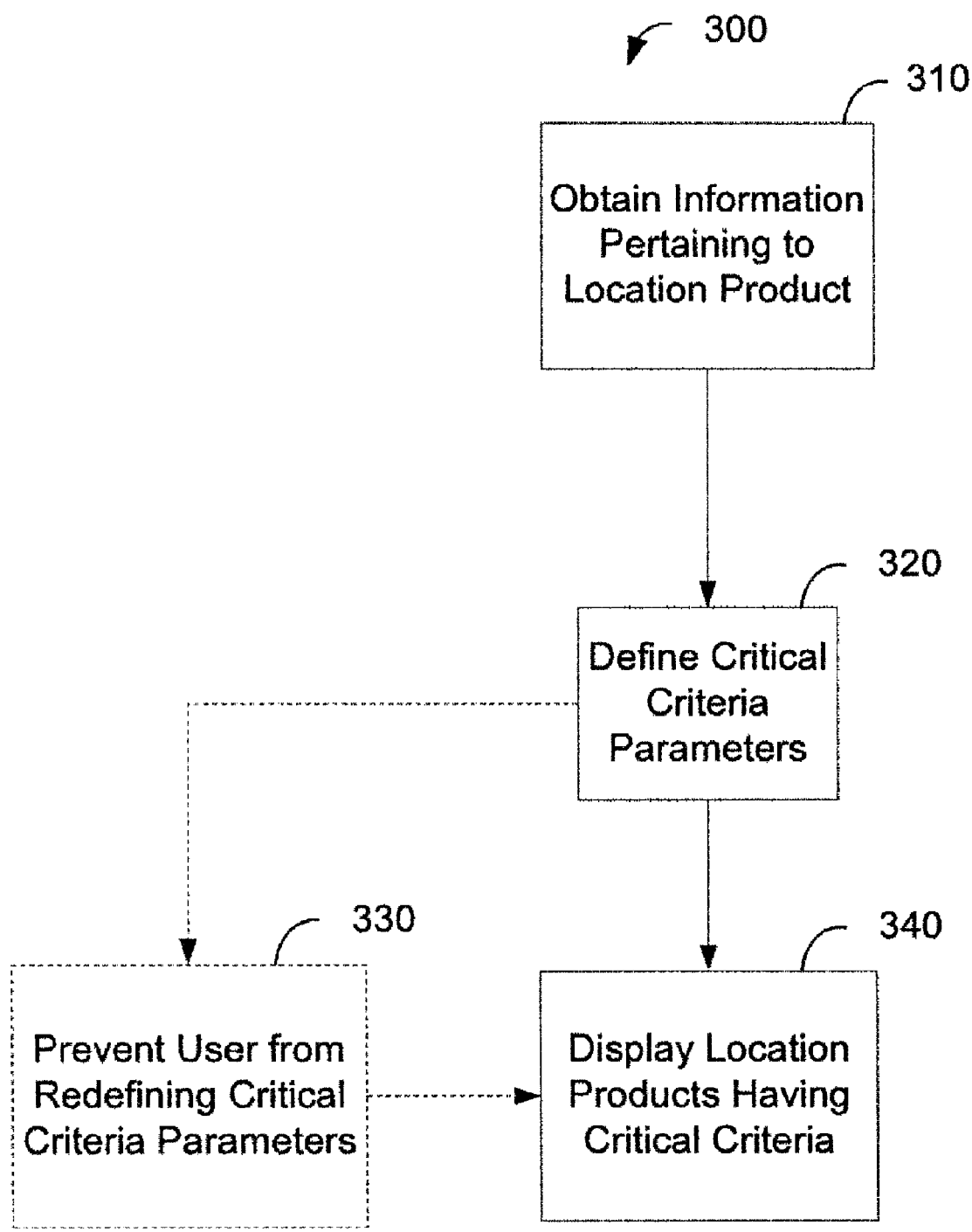
FIG. 3 is a flow diagram of a method for managing stock levels, optionally within the system of FIG. 1, according to another exemplary embodiment.

With reference to FIG. 3, another embodiment of the invention provides a method 300 of managing stock levels. The method 300 is implemented in an order management system using order proposals for management of the stock levels. Target-location-dependent information pertaining to a location product is obtained 310. Critical criteria parameters are defined 320 for the order management system. The critical criteria parameters correspond to location products requiring attention. Examples of critical criteria can include, but are not limited to, location products having zero or negative stock levels, an absence of forecast data or planning data, assignment of a contract to the location product. Other examples, can include worklist items that correspond to parameters that can indicate a location product requiring attention.

Optionally, the critical criteria parameters are defined 320 for the entire enterprise, so that each user, such as a replenishment planner, can use the same critical criteria. In one implementation, a user is prevented 330 from redefining the critical criteria parameters. In such a case, the critical parameters may be set by someone other than the user. Examples include a centralized staff for establishing critical parameters, a supervisor of a replenishment planner, or a customizing process performed at the initial implementation of embodiments of the invention or at specified intervals.

The location products having the critical criteria parameters are displayed 340 to a user. The critical criteria display helps a user to manage stock levels of location products, including those that may not be part of an existing order proposal, by displaying location products having one or more critical criteria parameters. Optionally, all users can be provided with the same critical criteria in which to filter from the larger group of location products.

It is important to note that the construction and arrangement of the stock management system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machines the machine properly views the connection as a machine-readable medium, Thus, any such connection is properly termed a machine-readable medium, Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps and decision steps.

What is claimed is:

1. A computer-implemented method of managing stock levels using order proposals, comprising:
   receiving, at an order management system comprising at least one processor and at least one memory, an active order proposal including transfer information for a first set of one or more location products, the transfer information including a source location, a receiving location, a product identifier, an order proposal quantity, and a delivery date;
   obtaining, using the order management system, target-location-dependent information pertaining to a location product not included in the active order proposal, the location product having a predetermined receiving location;
   generating, using the order management system, a worklist of a second set of one or more location products in response to receiving the active order proposal, wherein the worklist comprises the target-location-dependent information pertaining to the location product not included in the active order proposal;
   displaying, in a user interface, the worklist comprising the target-location-dependent information pertaining to the location product not included in the active order proposal;
   providing, in the user interface, a plurality of selection criteria for filtering the worklist, wherein at least one of the plurality of selection criteria comprises whether the location product not included in the active order proposal is included in another order proposal;
   receiving, from the user interface, a selection of at least one of the selection criteria from a user; and
   filtering, in the user interface, the displayed worklist based on the user selection.

2. The computer-implemented method of claim 1, wherein the selection criteria for filtering the worklist comprise a criterion that the receiving location is a distribution center.

3. The computer-implemented method of claim 1, wherein the selection criteria for filtering the worklist comprise a criterion that the receiving location is a store.

4. The computer-implemented method of claim 1, a product selection criteria.

5. The computer-implemented method of claim 1, wherein the selection criteria for filtering the worklist comprise a criterion that the supplying location is an external vendor.

6. The computer-implemented method of claim 1, further comprising:
   assigning a vendor subrange to a supplying location.

7. The computer-implemented method of claim 1, wherein the selection criteria for filtering the worklist comprise a criterion that the supplying location is a distribution center.

8. The computer-implemented method of claim 1, wherein the selection criteria for filtering the worklist comprise a criterion that the supplying location is a store.

9. The computer-implemented method of claim 1, wherein the selection criteria for filtering the worklist comprise assigned replenishment planner selection criteria.

10. The computer-implemented method of claim 1, wherein the selection criteria for filtering the worklist comprise a criterion that location products of the filtered worklist have no forecast data or planning data.

11. The computer-implemented method of claim 1, wherein the selection criteria for filtering the worklist comprise a criterion that location products of the filtered worklist have a zero stock level.

12. The computer-implemented method of claim 1, wherein the selection criteria for filtering the worklist comprise a criterion that location products of the filtered worklist have replenishment blocking.

13. The computer-implemented method of claim 1, wherein the selection criteria for filtering the worklist comprise a criterion that location products of the filtered worklist have been introduced within a specified period.

14. The computer-implemented method of claim 1, further comprising generating the worklist according to predefined critical criteria parameters, the critical criteria parameters unable to be redefined by a user.

15. The computer-implemented method of claim 1, wherein the selection criteria for filtering the worklist comprises assigned replenishment planner selection criteria.

16. A non-transitory computer-readable medium, the medium having processor-executable instructions stored thereon that, when executed by at least one processor, implement a method of managing stock levels, the method comprising:

receiving an active order proposal including transfer information for one or more location products, the transfer information including a source location, a receiving location, a product identifier, an order proposal quantity, a delivery date;

obtaining target-location-dependent information pertaining to a location product not included in the active order proposal, the location product having a predetermined receiving location;

generating, using the order management system, a worklist of a second set of one or more location products in response to receiving the active order proposal, wherein the worklist comprises the target-location-dependent information pertaining to the location product not included in the active order proposal;

displaying, in a user interface, the worklist comprising the target-location-dependent information pertaining to the location product not included in the active order proposal;

providing, in the user interface, a plurality of selection criteria for filtering the worklist, wherein at least one of the plurality of selection criteria comprises whether the location product not included in the active order proposal is included in another order proposal;

receiving, from the user interface, a selection of at least one of the selection criteria from a user; and filtering, in the user interface, the displayed worklist based on the user selection.

17. The non-transitory computer-readable medium of claim 16, wherein the selection criteria for filtering the worklist comprises receiving location selection criteria.

18. The non-transitory computer-readable medium of claim 16, wherein the selection criteria for filtering the worklist comprises supplying location selection criteria.

19. The non-transitory computer-readable medium of claim 18, wherein the selection criteria for filtering the worklist comprises assigned replenishment planner selection criteria.

* * * * *